United States Patent [19]

Larson et al.

[11] 4,284,170
[45] Aug. 18, 1981

[54] GAS TURBINE NOISE SUPPRESSOR

[75] Inventors: Richard S. Larson, Rocky Hill; Allan B. Packman, West Hartford, both of Conn.

[73] Assignee: United Technologies Corporation, Hartford, Conn.

[21] Appl. No.: 87,188

[22] Filed: Oct. 22, 1979

[51] Int. Cl.³ .............................................. F02K 1/00
[52] U.S. Cl. ................................. 181/213; 239/265.19
[58] Field of Search ................... 60/324, 226 RA, 262, 60/264, 694–697; 181/213–222; 239/265.13, 265.19

[56] References Cited

U.S. PATENT DOCUMENTS

| | | | |
|---|---|---|---|
| 3,055,174 | 9/1962 | Grotz et al. | 181/215 X |
| 3,927,522 | 12/1975 | Bryce et al. | 181/220 X |
| 4,175,640 | 11/1979 | Birch et al. | 181/213 |

Primary Examiner—L. T. Hix
Assistant Examiner—Thomas H. Tarcza
Attorney, Agent, or Firm—Norman Friedland

[57] ABSTRACT

Noise generated in a coannular airstream where there are concentric spaced pipes discharging the flow and the outer pipe extends beyond the inner pipe as in the tail pipe configuration of a fan-jet engine is dissipated by discreetly locating tabs extending internally at the discharge end of the inner pipe. This serves to destroy the coherence of the unsteady pressure field occasioned when the coannular flow streams comingle.

3 Claims, 3 Drawing Figures

GAS TURBINE NOISE SUPPRESSOR

BACKGROUND OF THE INVENTION

This invention relates to noise suppression and in particular to that signature of noise that is occasioned in a coannular flow stream where there are spaced concentric pipes where the outer pipe extends beyond the inner one in the discharge path of both streams.

The invention can probably be best understood by considering the problem that it solved. While the problem was attendant a fan-jet engine, it will be appreciated by one skilled in the art that the problem can be inherent in other coannular flow streams and, hence, the solution will have equal applicability. By noting the graph depicted in FIG. 1 which shows ⅓ octave band sound pressure level (curve B) plotted against frequency, it is apparent that around the 4000 hertz frequency a spurious noise is present. This noise has been prognosticated as being occasioned by the large scale turbulence of the inner flow stream egressing from the inner pipe or splitter in the tail pipe of the fan-jet engine which forms a helical unsteady pressure field that impacted the outer pipe downstream thereof.

We have found that we can reduce or even eliminate this unwanted noise by destroying the coherence of the unsteady pressure field. By locating inwardly facing tabs in an unsymmetrical pattern around the inner pipe or splitter, we have found by actual tests that we can reduce this generated noise by as much as 5 dB. The effect on the spurious noise at 4000 hertz of reducing the helical unsteady pressure field with the invention described herein is illustrated in FIG. 1 (curve A).

SUMMARY OF THE INVENTION

A feature of this invention is to destroy the coherence of the unsteady pressure field occasioned in a coannular flow stream environment having unequal length concentric pipes, with the outer pipe extending downstream from the inner pipe, by spacing asymmetrical inwardly facing tabs around the periphery of the inner pipe.

Other features and advantages will be apparent from the specification and claims and from the accompanying drawings which illustrate an embodiment of the invention.

DESCRIPTION OF THE PREFERRED EMBODIMENTS

For purposes of describing this invention in its preferred embodiment, the pertinent parts of the JT8D-209 engine manufactured by Pratt & Whitney Aircraft Group, division of United Technologies Corporation is shown. It is to be understood as will be apparent from the description to follow that the invention is not limited to fan-jet engines and its applicability in other environments will be obvious to anyone skilled in this art. As noted in FIGS. 2 and 3, the tail pipe section of the powerplant is depicted as consisting of a tail pipe 10, splitter 12 and the plug 14. All of these elements are well known and constitute existing components of the aforementioned JT8D-209 engine.

According to this invention, tabs 16 may be attached to the splitter 12 as shown or may be made integral therewith. Obviously to modify existing engines it would be appropriate and less costly to weld tabs 16 into place.

Figure 2:
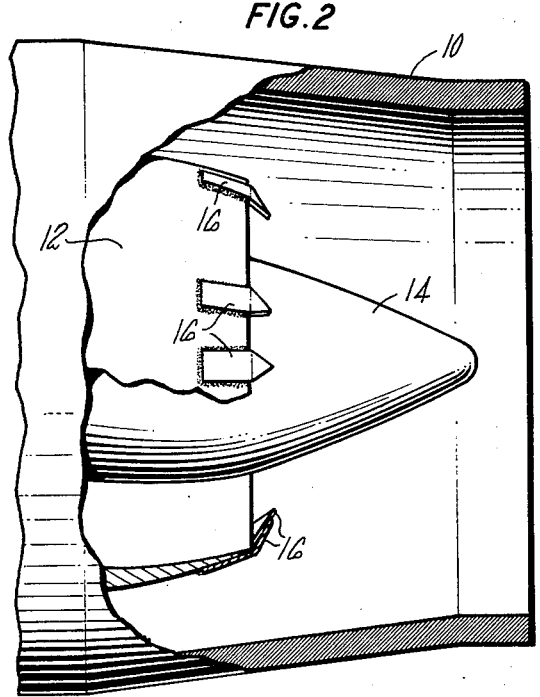
FIG. 2 is a partial view partly in elevation and partly in section showing the details of this invention.
Figure 3:
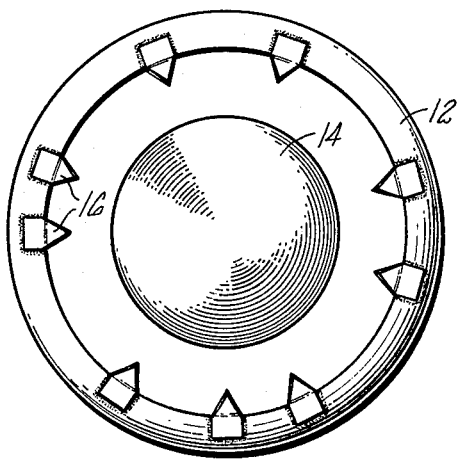
FIG. 3 is an end view of FIG. 2.

As can be seen in FIG. 3, the tabs, which are triangularly shaped, are disposed asymmetrically around the periphery of the splitter and extend inwardly. The extend to the tab protruding into the airstream and the angle it makes relative to the direction of flow and its particular shape will depend primarily on the drag it produces and hence the noise suppression characteristics and the performance penalties would be a primary consideration. As shown in FIG. 2 the tab extends at the exit plane of the splitter at an angle less than 90°.

Figure 1:
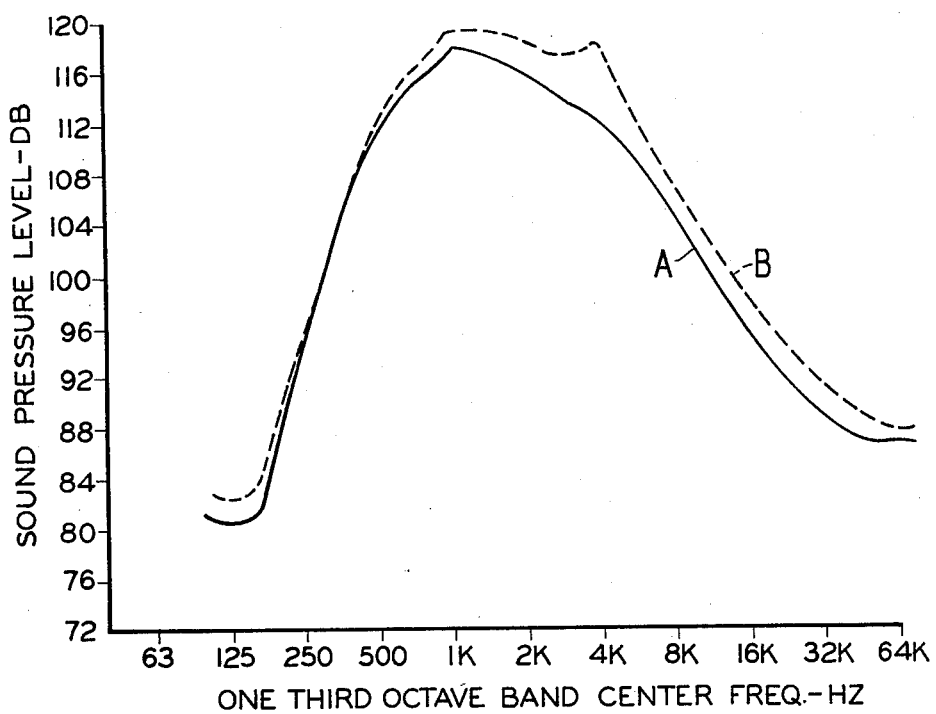
FIG. 1 is a graph plotting ⅓ octave band sound pressure level versus frequency to show the spurious noise at 4000 hertz generated by the parts of the engine illustrated in FIG. 2 (curve B) and the effect of the spurious noise suppression device (curve A)

A configuration as depicted in FIGS. 2 and 3 was tested on a 1/7 scale model of an engine run at the engine operating conditions where a significant decrease of 5 dB in the noise generated by the helical, unsteady pressure field was obtained, as is illustrated by the curve A of FIG. 1.

It should be understood that the invention is not limited to the particular embodiments shown and described herein, but that various changes and modifications may be made without departing from the spirit or scope of this novel concept as defined by the following claims.

We claim:

1. Means for reducing spurious noise in a tail pipe in a turbo fan engine having concentric pipes defining coannular flow passages for the fan air and the engine core gases and where the outer pipe extends downstream of the inner pipe and where the flow egressing from the inner pipe forms a helical unsteady pressure field impacting the outer pipe at some distance downstream thereof, said means comprising a plurality of tab-like elements having a projection extending radially inwardly at the discharge end of the inner pipe for destroying the coherence of the unsteady pressure field and said tab-like elements being circumferentially and asymmetrically located about the inner pipe.

2. Means as in claim 1 wherein said projections are shaped in a triangularly shaped tab with the apex being the furthest point extending radially into said inner pipe.

3. Means as in claim 2 wherein said tab-like element is angularly spaced relative to a plane extending through the discharge end of said inner pipe and forms therewith an angle that is less than 90°.

* * * * *

UNITED STATES PATENT AND TRADEMARK OFFICE
CERTIFICATE OF CORRECTION

PATENT NO. : 4,284,170
DATED : August 18, 1981
INVENTOR(S) : Richard S. Larson and Allan B. Packman It is certified that error appears in the above—identified patent and that said Letters Patent is hereby corrected as shown below:

Column 2, line 25, cancel "tend to" and insert -- tent of --

Signed and Sealed this

Twenty-fifth Day of May 1982

[SEAL]

Attest:

GERALD J. MOSSINGHOFF

*Attesting Officer*  *Commissioner of Patents and Trademarks*